United States Patent [19]

Coleman et al.

[11] Patent Number: 5,517,662
[45] Date of Patent: May 14, 1996

[54] MULTIPROCESSOR SYSTEM WITH DISTRIBUTED MEMORY

[75] Inventors: John J. Coleman, Poughkeepsie; Ronald G. Coleman, Hyde Park; Owen K. Monroe, Port Ewen; Robert F. Stucke, Saugerties; Elizabeth A. Vanderbeck; Stephen E. Bello, both of Kingston; John R. Hattersley, Saugerties, all of N.Y.; Kien A. Hua, Oviedo, Fla.; David R. Pruett, Saugerties; Gerald F. Rollo, Poughkeepsie, both of N.Y.

[73] Assignee: International Business Machines Corporation, Armonk, N.Y.

[21] Appl. No.: 335,926

[22] Filed: Nov. 8, 1994

Related U.S. Application Data

[63] Continuation of Ser. No. 794,749, Nov. 19, 1991, abandoned.

[51] Int. Cl.$^6$ ...................................................... G06F 13/14
[52] U.S. Cl. ............... 395/800; 395/200.01; 395/200.02; 395/200.03; 395/200.2; 395/859; 395/312
[58] Field of Search ............................. 395/800, 200.01, 395/200.02, 200.03, 200.2, 859, 312

[56] References Cited

U.S. PATENT DOCUMENTS

| | | | |
|---|---|---|---|
| 4,228,496 | 10/1980 | Katzman et al. | 395/308 |
| 4,378,588 | 3/1983 | Katzman et al. | 395/877 |
| 4,400,778 | 8/1983 | Vivian et al. | 395/550 |
| 4,491,916 | 1/1985 | Vallhonrat | 395/287 |
| 4,562,533 | 12/1985 | Hodel et al. | 395/200.14 |
| 4,769,771 | 9/1988 | Lippmann et al. | 395/200.03 |
| 4,811,210 | 3/1989 | McAulay | 395/312 |
| 4,851,988 | 7/1989 | Trottier et al. | 395/200.01 |
| 4,908,823 | 3/1990 | Haagens et al. | 370/85.1 |
| 4,949,299 | 8/1990 | Pickett | 395/285 |
| 4,991,079 | 2/1991 | Dann | 395/200.08 |
| 4,991,133 | 2/1991 | Davis et al. | 395/375 |
| 4,994,985 | 2/1991 | Cree et al. | 364/514 C |
| 5,008,882 | 4/1991 | Peterson et al. | 370/94.3 |
| 5,020,020 | 5/1991 | Pomfret et al. | 395/200.13 |
| 5,040,141 | 8/1991 | Yazima et al. | 364/400 |
| 5,226,125 | 7/1993 | Balmer et al. | 395/312 |
| 5,392,429 | 2/1995 | Agrawal et al. | 395/650 |

OTHER PUBLICATIONS

Brown et al., application Ser. No. 429,267 entitled "Switch and its Protocol for Making Dynamic Connections", filed Oct. 30, 1989.
Bono et al., application Ser. No. 358,774 entitled "Computer System High Speed Link Method and Means", filed May 30, 1989.
Detschel et al., application Ser. No. 558,003 entitled "Personal Computer Bus and Video Adapter for High Performance Parallel Interface", filed Jul. 25, 1990.

*Primary Examiner*—Alyssa H. Bowler
*Assistant Examiner*—D. Tran
*Attorney, Agent, or Firm*—Floyd A. Gonzalez; James E. Murray

[57] ABSTRACT

A parallel computer system is disclosed comprising a plurality of high level processors joined together using a cross-point or cross-bar switch. The system includes an adapter between each processor and the switch. Protocol processing to drive the switch, transfer pages and schedule transmissions between the processors is performed by the adapter. The protocol use the notion of typed or tagged buffer management that allows a client to bind the semantics of a message being sent or received. These semantics specify behaviors in the protocol when message packets depart or when they arrive.

10 Claims, 5 Drawing Sheets

| ATTRIBUTE → 6  CLASS ↓ | NON-PERSISTENT | PERSISTENT | RECEIVE DELAYED | RECEIVE THROUGH | RECEIVE POLLED | SEND | FETCHABLE 5 | ADAPTER ONLY 5 |
|---|---|---|---|---|---|---|---|---|
| 1 | X | | X | | | | | |
| 2 | X | | X | | | X | | |
| 3 | X | | | X | | | | |
| 4 | X | | | X | | X | | |
| 5 | X | | | | X | | | |
| 6 | X | | | | X | X | | |
| 7 | X | | | | | X | | |
| 8 | | X | | | | X | X | |
| 9 | | X | | | | X | | X |
| 10 | | X | | | | X | X | X |
| 11 | | X | X | | | | | |
| 12 | | X | | X | | | | |
| 13 | | X | | | X | | | |

FIG.8 ns system design for numerically intensive engineering and
MULTIPROCESSOR SYSTEM WITH DISTRIBUTED MEMORY

CROSS REFERENCE TO RELATED APPLICATION

This application is a continuation of application Ser. No. 07/794,749, filed Nov. 19, 1991, now abandoned.

This invention relates to a multiprocessor system and more particularly to an apparatus and method that permits one processor to address and access the storage that exists on another processor.

BACKGROUND OF THE INVENTION

A well-known technique for increasing the work throughput of a processing system is to divide up the work into a plurality of processes and coupling the separate processes to separate processors each handling a part of the process. Parallel processing using either few processors or thousands of processors requires some form of communication between the processors. There are many types of systems such as shared storage where the processors share common storage or distributed systems where the processors each have part of the global storage. There are various types of coupling from tightly coupled to loosely coupled. The coupling can be a LAN, a cross-point or cross bar switch, a nearest neighbor, hierarchical, hypercube, etc. In all of these systems latent inefficiencies and overhead in communication slow down performance of the system. It is desirable and an object of this invention to reduce this overhead and provide a method and apparatus of highly efficient message passing requiring radically different communication patterns, characteristics and resources. While there exists systems to parallel a few high level processors or massively parallel low level processors (such as in Hellis U.S. Pat. No. 4,598, 400) there is need for paralleling high level processor with improved and flexible communications between these high level processors. Further, some means must be provided for generating and scheduling work requests. A system using a large number of high level processors such as IBM's RISC System/6000™ is desirable for handling large, complex problems such as for intensive engineering and scientific applications. (RISC System/6000 is a trademark of the IBM Corporation).

SUMMARY OF THE INVENTION

In accordance with one embodiment of the present invention a parallel computer system has a plurality of independent computers each with their own memory connected to each other by a network. An adapter is coupled between the network and each independent computer such that there is a pair of adapters between each pair of computers. The adapters include a processor and memory. An application defines a name space in memory and a tag that specifies how the space will be used (semantics) in order to establish a communication path between processors. Data is sent from one adapter memory to another, using the information defined in the class established by the application.

DESCRIPTION OF THE EMBODIMENT OF THE PRESENT INVENTION

Figure 1:
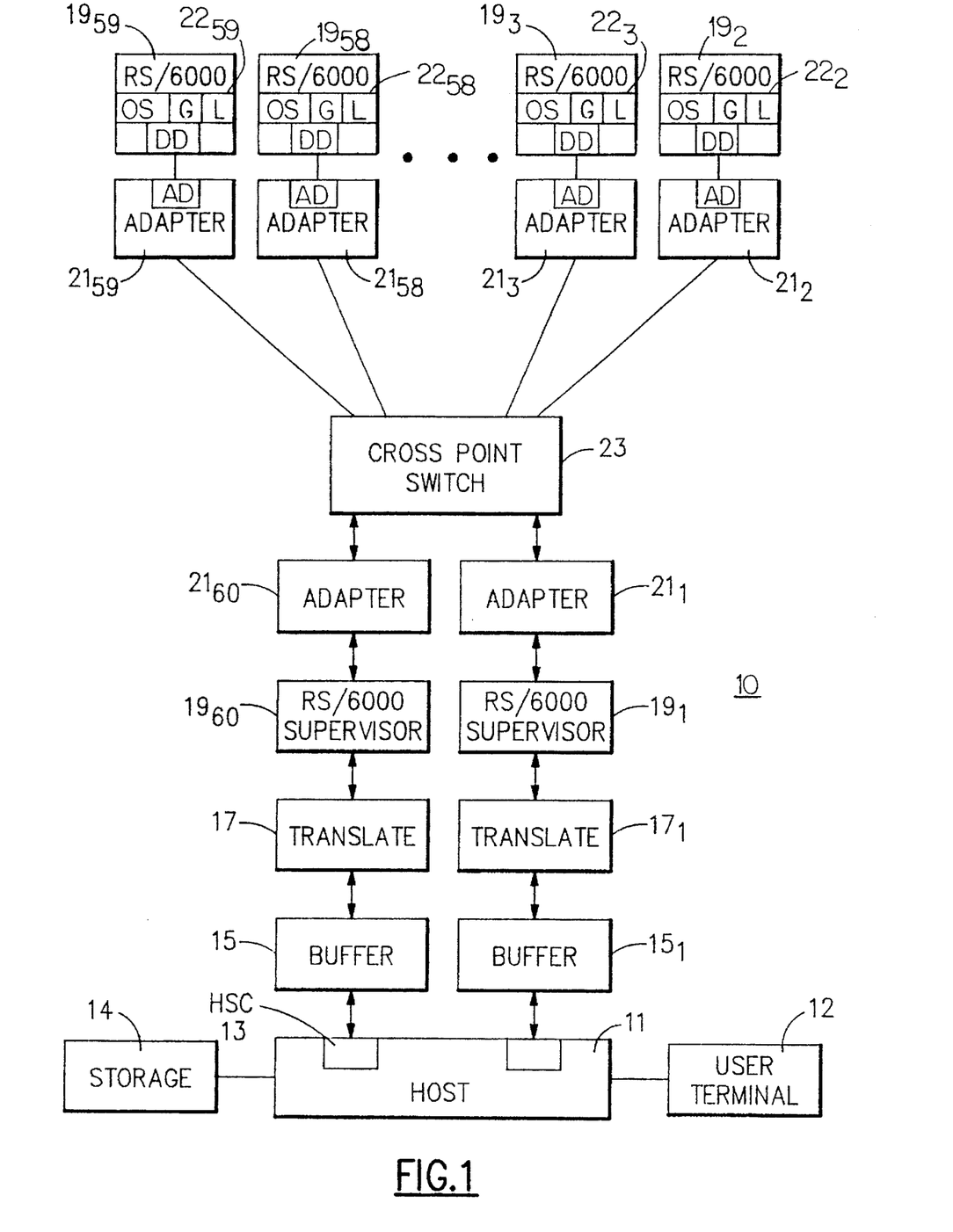
FIG. 1 is an overall block diagram of the system according to one embodiment of the present invention.

Referring to FIG. 1 there is illustrated a parallel processing system design for numerically intensive engineering and scientific applications in accordance with one embodiment in the present invention. The system 10 comprises 60 RISC System/6000 (hereinafter referred to as RS/6000 microprocessor nodes $19_1$–$19_{60}$, each with its own RS/6000 processor, memory and disk storage 22 linked to each other by a cross-point switch 23 such as an IBM 9032 Enterprise Systems Connection Director (ESCD) optical switch. A more detailed description of the switch and the protocols is found in Brown et al., incorporated herein by reference, application Ser. No. 07/429,267 filed Oct. 30, 1989 entitled "Switch and Its Protocols for Making Dynamic Connections". The inputs and outputs of this switch are serial fiber optic. Link frame messages are decoded to control the appropriate switches. This switch 23 is linked to a host processor 11 such as a 3090 system via high speed channel 13 (HSC) which connection is described in U.S. patent application Ser. No. 07/358,774 of Bono et al. entitled "Computer System High Speed Link Method and Means." This high speed connection may also be performed by a HIPPI switch. Information is passed by operating the host processor with paging instructions of unique page addresses designated for an extended channel as described in the above cited co-pending patent application incorporated herein by reference. A user interface 12 inputs programs and instructions to the host and receives its output from the system. Also connected to the host is a mass storage 14 for storing data and programs to be loaded into processor node storage 22 for execution. The host is coupled to one of the RS/6000 processor nodes $19_{60}$ via a buffer 15 and HSC 13 and a translation adapter card 17 which converts AIX/370 architecture to microchannel as described in U.S. patent application Ser. No. 07/558,003 of Detschell, filed Jul. 25, 1990 entitled "Personal Computer Bus and Video Adapter for High Performance Parallel Interface". This application is incorporated herein by reference. The RS/6000 processor node $19_{60}$ is a supervisor that divides up the work or tasks among the other processors and feeds answers back to the host. An adapter $21_1$–$21_{60}$ is coupled between each processor node $19_1$–$19_{60}$ and the cross-point switch 23. This adapter allows the processor nodes 191 to 1960 to operate interdependently since it permits any processor to communicate with any other processor under software control. A redundant host access and supervisor link made up of elements $15_1$, $17_1$, $19_1$ and $21_1$ is also provided. One path may be used to transmit from the host while the other couples return signals to the host. Individual RS/6000 processors at nodes $19_1$–$19_{60}$ work on different parts of a complex computation or tasks, and by exchanging intermediate results with other processors at the other nodes, arrive at the complete solution. The programming interface to the system can be for example enhanced clustered FORTRAN running in an AIX operating system environment on each microprocessor node $19_1$–$19_{60}$. Migration of existing applications is enhanced by the use of easily understood programming constructs and a standard operating environment.

The software components of this system are the Enhanced Clustered FORTRAN facilities, a job manager, a file access mechanism, a performance monitor which monitors utilization of the system and provides reports to the user interface, a file access mechanism which assists in servicing calls, and a debugger. The system uses AIX/370 on the host platform 11 and AIX 3.1 operating system on the microprocessors $19_1$–$19_{60}$. The Enhanced Clustered FORTRAN language provides additions to FORTRAN for creating and executing parallel processes, for interprocess communication, and for process coordination. The job manager, which runs on the host 11, provides AIX services for compiling, executing, debugging, clearing, and cancelling jobs. The file server, or file access mechanism, allows applications to access host files and return computed results to the users directory. The performance monitor facilitates program debugging and optimization by providing graphical analysis of hardware and software functions.

An adapter 21 is coupled between the micro channel and the cross-point switch which in the example is again AIX/370 channel. Similarly between each microprocessor 19 and the switch 23 is the new serial channel adapter 21. Each of the RS/6000 nodes 19 has one memory section for local memory L and a second section of memory G for global access.

Figure 2:
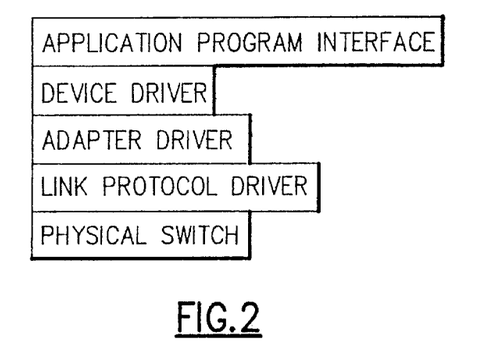
FIG. 2 illustrates architecture layers.
Figure 3:
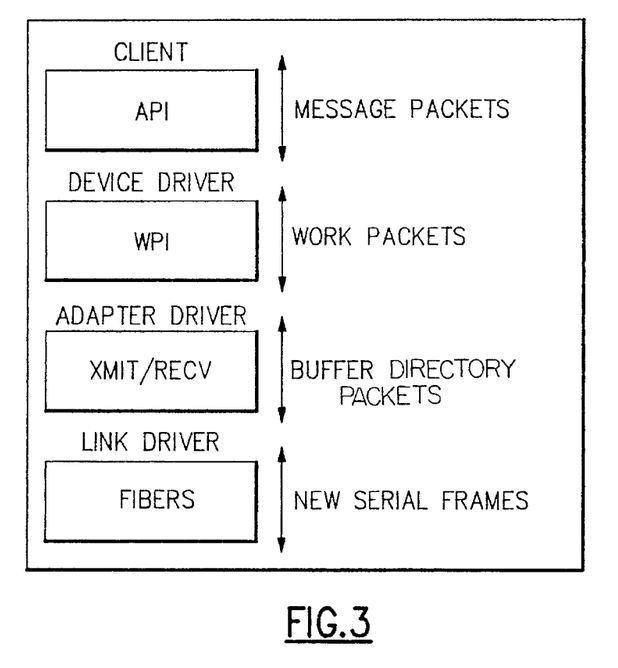
FIG. 3 illustrates message flow.
Figure 4:
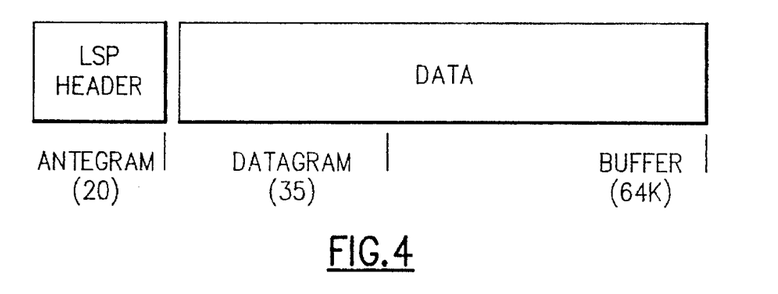
FIG. 4 shows format of message packet.
Figure 5:
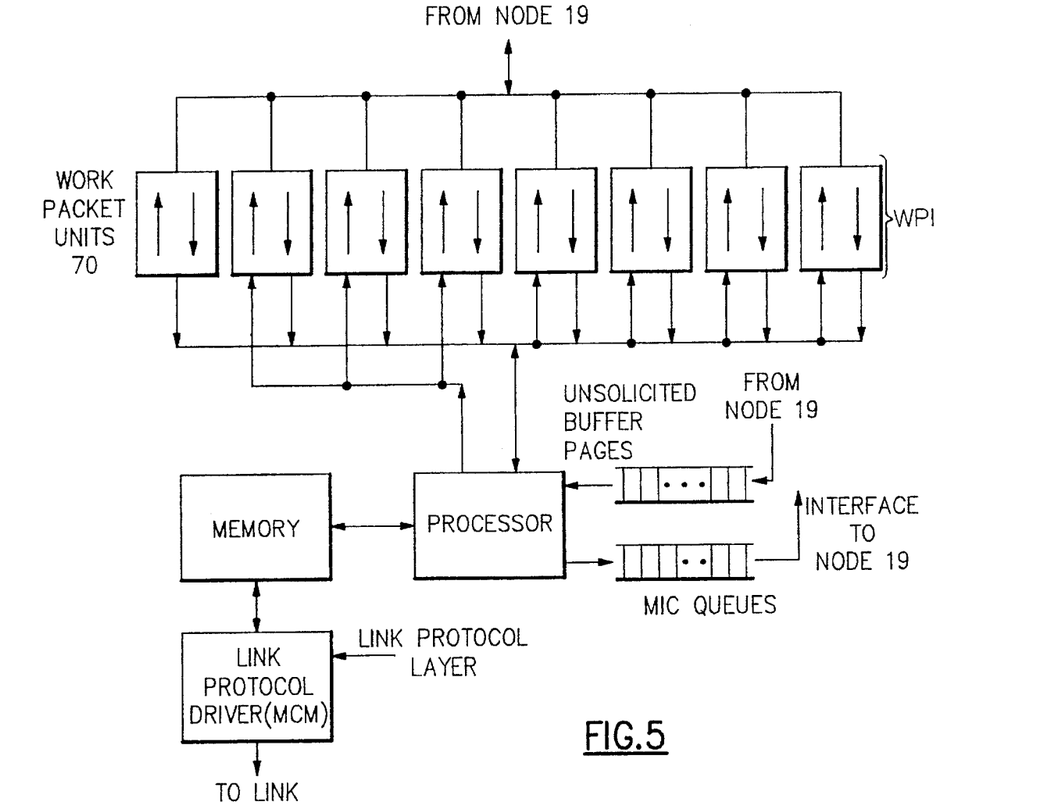
FIG. 5 illustrates the adapter.
Figure 6:
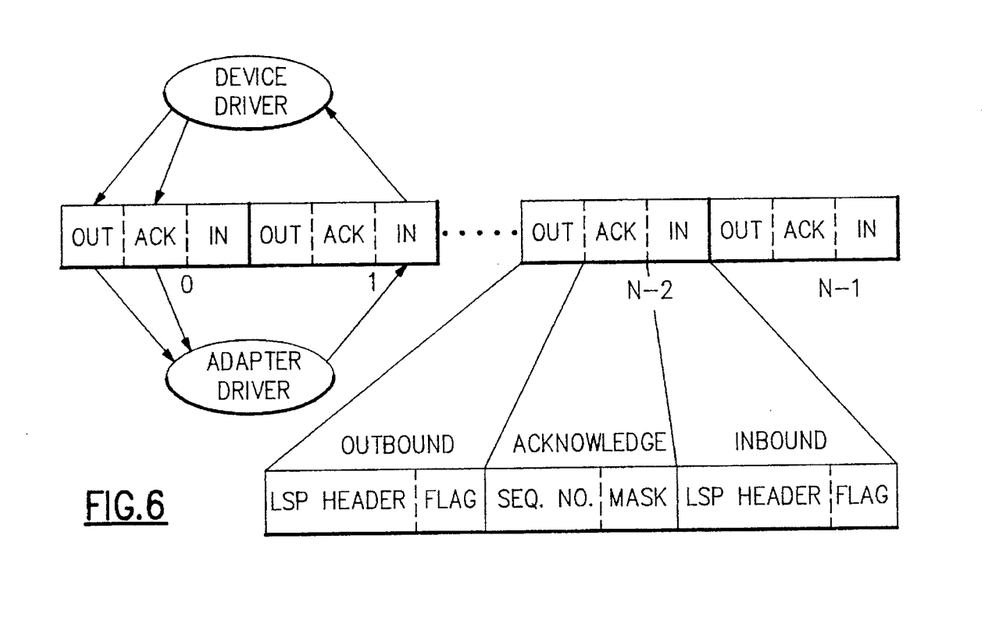
FIG. 6 illustrates operation of WPI.

The architecture of the system 10 is layered and follows the hardware in systems structures of the new serial channel adapter, the RS/6000 and the AIX operating system. See FIG. 2. Also see FIG. 3 which illustrates the message flow across interfaces. The new serial adapter 21 has its own processor which is, for example, an i960 processor of INTEL. The logical link control architecture is one layer divided into five sublayers: the top layer provides a system level application program interface (API) for transport and network protocols. This is located in each of the processors at nodes $19_1$–$19_{60}$. This layer provides functions for "binding" and "unbinding" a client or application, sending and receiving messages as well as other functions that are required by the application. The second layer is the device driver. This is also located in the RS/6000 processor $19_1$–$19_{60}$. In the embodiment shown there is an adapter driver sublayer 21 for each processor 19. In other embodiments there may be separate multiple adapters for each processor $19_1$–$19_{60}$. All adapters 21 attach to the local processors (RS6000 in this example) managed by one device driver DD. This device driver in each processor $19_1$–$19_{60}$ runs in an AIX architecture program kernel in both process and interrupt context. It manages the hardware interface and data structure between the API and the NSCA 21. This includes attaching to the bus, flushing the cache in the RS/6000, servicing interrupts, chaining/dechaining and managing kernel-resident queues. It translates message packets into work packets to be handled by the API and adapter drives respectively and vice versa. The client produces and consumes message packets (as peer communications) and the adapter driver 21 produces and consumes work packets. A work packet is a generalized request for service exchanged between the device driver and the adapter driver. In general, one send message or one receive message will generate one work packet and vice versa. Message packets are of three types depending on the amount of data they carry. These packet types are antegram messages, datagram messages, and buffer messages. (Referring to FIG. 4, there is shown the format of a message with a header, a datagram and a buffer). An antegram packet is a message packet which contains no data. The antegram packet contains only the protocol header which is a short block of instructions and control information. Datagram messages and buffer messages contain the protocol header as well as data. Datagram messages carry a maximum of thirty-five bytes of data, while buffer messages carry up to one page of data. As currently implemented, the protocol allows page length to be up to 64K bytes. Datagram messages and buffer messages are queued and must be handled by the device driver in the order in which they are received. Antegram packets, however, can be handled ahead of all other pending messages, in such priority as requested in the protocol header. The work packets comprise three types: pure, ordinary and Complex or two-phase. Pure work packets consist of a call to interrupt service routine (ISR). Ordinary work packets include a protocol header and 4 bytes of flag information. Ordinary work packets, like pure work packets, contain a call to an ISR but also contain a control block of instructions and control information to be processed by the receiving element. This may be a device driver in 19 or adapter driver 21, whichever the case may be. Ordinary work packets are, for example, 28 bytes, and correspond to antegram and datagram message packets, which are generated and processed by the API. Complex or two-phase work packets consist of ordinary work packets and a transfer of data over the microchannel interface between devices. With two-phase work packets, data transfer occurs in a separate, later phase from one in which control information is exchanged, hence the name "two phase". The adapter driver sublayer in adapter 21 runs entirely outboard of the processor as a program in the adapter itself. It schedules buffer packets for departure and arrival on the fiber through the work packet interface (WPI). It interprets the semantics of buffer attributes and arranges all transfers to and from the host system virtual storage. Referring to FIG. 5, the adapter includes a work packet interface 70 which is a system of queues. Each structure in the WPI is, in turn, divided into three substructures: one for work packets bound for the adapter driver (outbound), one for work packets bound for the device driver (inbound), and one for passing acknowledgement proscriptions from the device driver to the adapter driver. The WPI structures reside in a storage resource shared by both the device driver and the adapter driver. See FIG. 6. Work packets are serviced in the following manner. The adapter driver polls the WPI outbound structures and schedules the services requested for any work packets found. In contrast, the device driver receives the first part of its work packets by ISR (Interrupt Service Routine) and the rest during the same interrupt cycle. Typically, a call will be made to the device driver's ISR, then the work packet is read out of the WPI structure(s) and processed sequentially. When a device driver sends out a work packet, it can proceed in a couple of ways. On behalf of the client, the device driver can behave synchronously and spin-wait until a first-level acknowledgement (FACK) is returned. Alternatively, the device driver may behave asynchronously by delivering several work packets in pipelined fashion over the WPI without waiting for the FACKs. The device driver can also request a transmit complete acknowledgement (i.e., a pure work packet) to indicate when the data has been moved from the host system or it may request a second-level acknowledgement (SACK) to indicate when the data has been transmitted to the receiving node. A SACK is an ordinary work packet dispatched to the source application client as an antegram message. This invention thus permits both the synchronous and asynchronous modes of operation. The fourth sublayer is a link protocol layer in adapter 21. It implements the link and device protocols of the crosspoint switch as illustrated in FIG. 1.

Microchannel Interface Controller MIC transfers are staged through two staging buffer pools, one for sending message packets outbound to another PE, one for receiving message packets inbound from another PE. They are called transmit (xmit) and receive (recv) buffers respectively.

The data associated with a message must (1) be on or within a pinned page boundary in AIX virtual storage and (2) not be accessed until the device driver has "freed" the page. The adapter driver issues a data transfer command to the MIC at an indeterminate time after a work packet has been queued. Thus, sending a message, for example, a client could well return from the API before the adapter driver has even transferred the data to its xmit buffer pool.

The buffer attributes and the queuing discipline determine the actual data movement. Once the data has been transferred, the adapter driver sends a pure work packet to the device driver to free the page. The adapter driver also implements the routing semantics of the quadruple address (PE,channel,peck-unit,buffer-id). On sending and receiving, it interprets (*,*,peck-unit,buffer-id) in the message per the attributes the client binds in advance. On sending, it maps (PE,channel,*,*) to a physical port number on the switch. This port number is then used to direct a connection through the switch.

Below the adapter driver is the link protocol driver. Its runs entirely in the link protocol driver engine on the NSCA. It implements a subset of the link and device protocols of the crosspoint switch in the manner illustrated in FIG. 7. It creates/breaks switch connections, packs/unpacks LSP packets through switch frames, and sends/receives these packets through the xmit and recv buffers scheme as buffer directory packets. A buffer directory packet is a generalized strategy for exchanging information between the adapter driver and the link protocol driver.

The interface between the i960 processor and the link protocol driver is through a shared region in the local data store (LDS) or local processor store (LPS). This shared region holds three metadata variables: (1) a nextrecvavail variable that points to the next available receive buffer, (2) a nextxmitavail variable that points to the next available transmit buffer and (3) an up interlock turn variable which says who (i960 or MCM) is allowed to update the next xmit/recv variable pointers. The xmit/recv buffers form a circular list data structure which is in LDS and the metadata can be in either LDS or LPS. The next variables actually contain head and tail subfields.

Either the adapter driver is up or the link protocol driver is up. When the adapter driver is up, it is busy, say, scanning the WPI. When it quiesces, it writes the link protocol driver's value into the interlock and continues. When the adapter driver does this, it agrees not to update the next variables—from its perspective, the state of those variables quiesces.

When the link protocol driver is up, this means that it can update the next variables freely. It also means that it can accept outbound deliveries (if there are any) or that it can accept inbound deliveries (if there are any). If the link protocol driver does not have any work to do, i.e., no outbound or inbound deliveries, it quiesces by writing the adapter driver's value into the interlock. Like the adapter driver earlier, doing so, it agrees not to update the next variables.

During the quiescent state, the adapter driver will be doing possibly three things. One is pushing the received data back to system memory through the MIC from the recv buffers. Another is pulling send data from system memory through the MIC to the xmit buffers. Finally, it may scan the WPI, processing work packets as necessary.

When the adapter driver is up, it gathers the state of the xmit/recv buffers. It then quiesces and continues processing the three items mentioned above. Thus, the adapter driver is in the idle state if (1) no more than one item is ahead in the send queue and (2) it is up.

In the quiescent state, the link protocol driver may be doing possibly two things: sending or receiving data. Like the adapter driver, during the up state, it gathers the xmit/recv data and then quiesces.

In the quiescent state the link protocol driver can accept exactly n incoming deliveries until it is up again. The value n is the number of available recv buffers. The head component is advanced by the link protocol driver when it is up. The tail component is advanced by the adapter driver when it is up.

Figure 7:
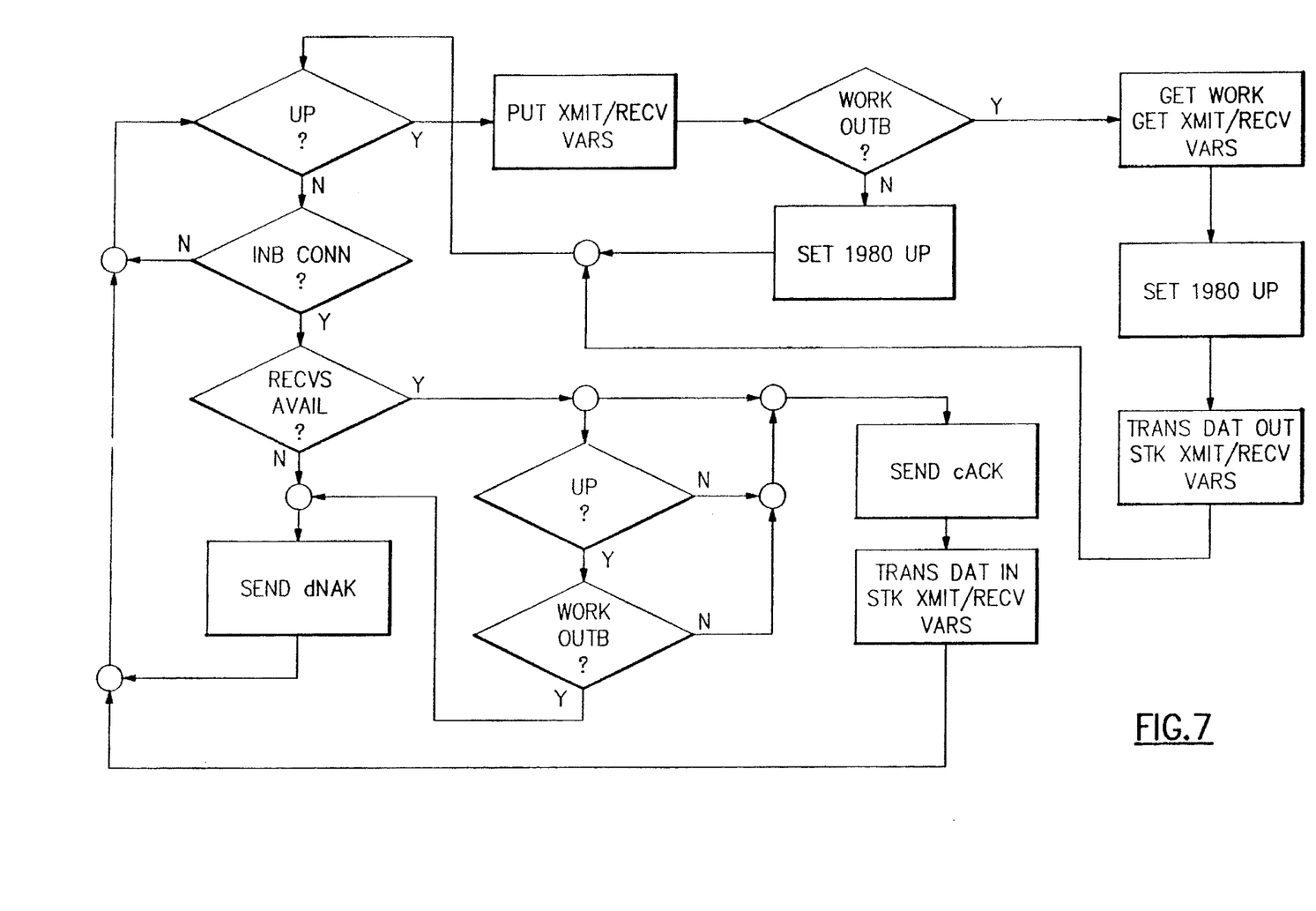
FIG. 7 is a flow diagram of link protocol driver processing.

A detailed picture of link protocol driver processing is shown in FIG. 7. FIG. 7 shows control loops of the link protocol driver. The link protocol driver is either processing outbound work, waiting for inbound connections or waiting to be up. An analogus algorithm can be constructed for the i960.

In this communications management system, an application defines a name space of buffers in available memory and a tag that specifies the class of how the name space will be used (semantics) in order to establish a communication path between logical processors. The semantics are bound to the name space until such time as the application changes the tags associated with the buffer or releases the buffer. From an application perspective, data is sent from one logical buffer to another, using the information defined in the class established by the application. It is done by hardware external from the logical processor freeing the processor from handling communication interrupts. The logical processor invokes the functions of the communications manager and in a group of cooperating and communicating logical processors each processor must have a unique identifier.

The outboard adapter driver hides low level interface details from the processor, creates low level headers, generates low level function calls, breaks page-size blocks of data from the application into media-specific frames, and maps class characteristics to the name spaces (buffers). It will schedule and cache inbound and outbound transmissions with respect to the buffer semantics statically configured by the application. It manages the buffer pool and implements all queueing.

The communication manager will queue inbound and outbound data requests in an n-deep FIFO queue. There is one queue per destination. Data itself is not queued, only the requests for data. Requests are dequeued in accordance with receive attributes of name space (buffer). In this way ordering is preserved and destination busy conditions are eliminated at the source.

Figure 8:
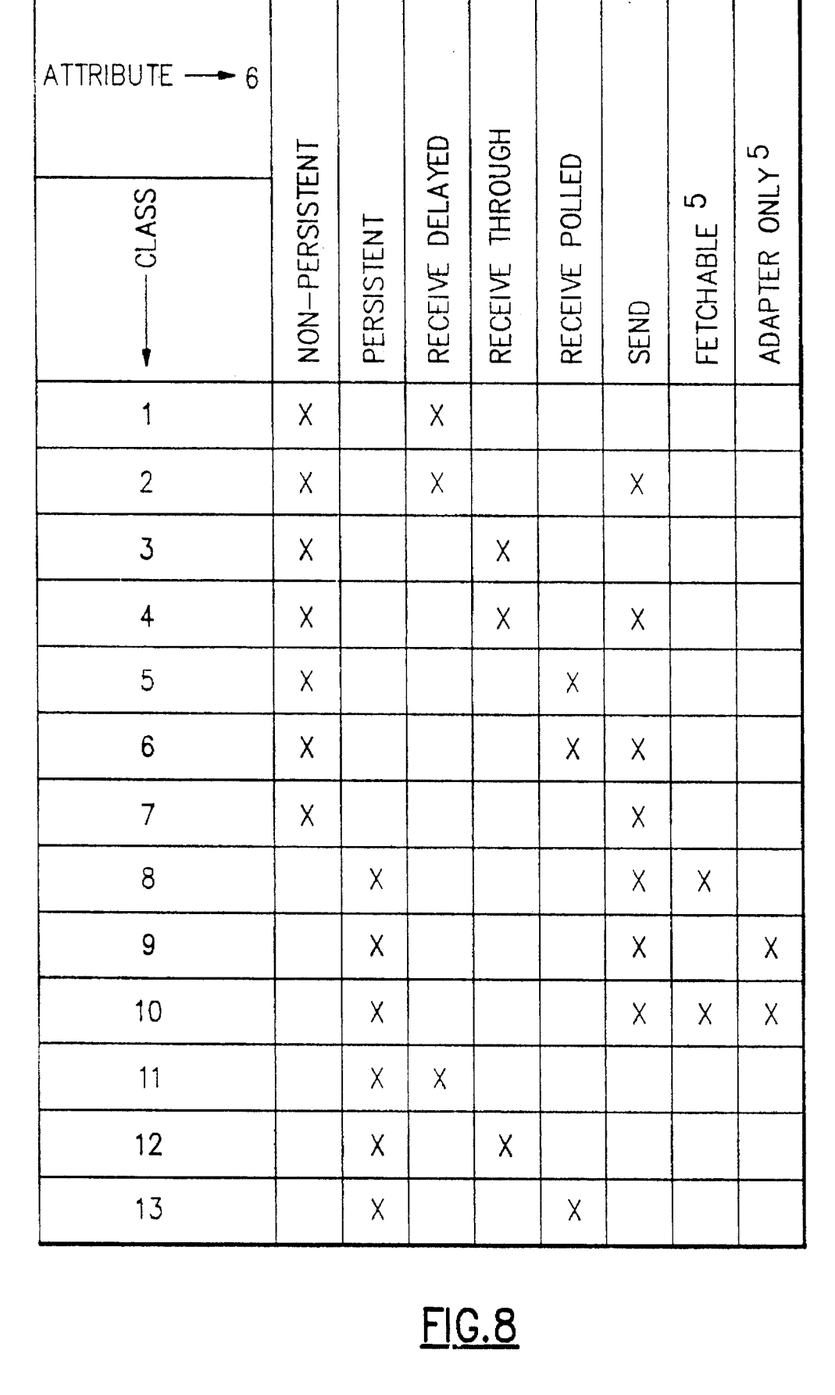
FIG. 8 is a Table of Class—attribute matrix.

An attribute is a static value which describes a specific name space characteristic, e.g., a buffer attribute may specify a "send" or "receive" characteristic. The class is a set of attributes made available to the application that reflects a logical way the adapter driver will manage the buffer. See FIG. 8.

There is a finite number of pre-defined classes (attribute sets). These classes cannot be altered by the application, but the application can change the class of any buffer that it controls. To ensure efficient communications, applications do not define other combinations of attributes.

In this section, we describe the concept of buffers and buffer management. The system uses several kinds of buffers. Those that are used for internal purposes are transparent to the client. Examples of these include the auxiliary xmit/recv buffers, buffers maintained for unsolicited receives, etc. From a client's point of view, a buffer is a logical storage resource used for sending and receiving data. For these purposes, a buffer is addressed by the logical pair, (peck-unit,buffer-id).

A client defines (1) the name space of a buffer and (2) the tag that specifies the buffer semantics. These semantics remain bound until the client either changes the tags or unbinds the name. The attributes specify well defined behaviors for system when messages are sent or received.

The (peck-unit,buffer-id) pair is a logical storage address. At some point, this pair must be bound to physical storage. This design supports both late and early binding. These are the two major buffer classes.

If the binding is early (and by implication, static) the buffer's attribute is persistent. Persistent buffers behave like shared memory. There is a one-to-one mapping from the (peck-unit,buffer-id) pair to the physical storage. Local sends and receives on a buffer with this attribute behave like local accesses and updates. Remote sends and receives behave like remote accesses and updates. In this sense, the data (and the name mapping) persists.

If the binding is late (and by implication dynamic), the buffer's attribute is nonpersistent. Nonpersistent buffers behave like n-deep FIFO links. There is potentially a one-to-many mapping from the (peck-unit, buffer-id) pair to physical storage. Sends and receives on a buffer of this attribute are queued outbound to or inbound from a remote PE. The data does not persist.

The buffer with a receive-type attribute can receive data from a remote PE. It cannot be used to send messages. There are three distinct receive attributes. These attributes specify when and how to deliver a receive notification. A receive notification (RVN) is a "signal" sent to the destination client that a message has been received for it. If the attribute is receive-through, the RVN is sent for each arriving message. If ten messages arrive, ten calls to the notification routine are scheduled. If the attribute is receive-delayed, only one RVN is sent for a block of messages. The block size is determined by the number of work packets created by the adapter driver in a single interrupt cycle. If three messages arrive in one interrupt, and seven in another, two calls to the RVN routine are scheduled. These two attributes represent a heuristic trade-off between throughput and response. High performance clients that perform their own buffer management will select one of these attributes. If the attribute is receive-polled, no RVN are sent. The client must "poll" for its messages by calling the API receive function. This attribute is useful for low performance clients that do not perform their own buffer management. Here, this system's internal buffers are used and memory-to-memory copies move that data from kernel memory to the client's memory.

A buffer with a send-type attribute can be used to send data to a remote PE. It cannot be used to receive messages. There are three distinct send attributes. These attributes specify when and how to deliver a transmit notification (XTN). An XTN is a "signal" sent to a source client when the message's data page is accessible again. If the buffer attribute is send-through, an XTN is sent after each page has been DMA'd to an xmit buffer on the adapter. At this point, a client may deallocate the page or use it to send another message. An XTN does not mean that the message has left the system, however. Another facility, SACK are used for that purpose. If the buffer attribute is send-delayed, only one XTN is sent after for a block of pages that have been DMA'd. The size of the block depends on the messages that can be dispatched through adapter driver. Again, these two attributes represent a heuristic trade-off between response and throughput. If the buffer attribute is send, an XTN is not sent at all. This attribute is useful for clients that perform their own buffer management. Here, for example, client-level acknowledgements are used to notify when pages are free.

The semantics of adapter-only specify primarily that the buffer is to be allocated in LDS adapter space.

The semantics of fetchable attribute specify whether the buffer can be accessed remotely by another adapter driver. The buffer must be in the fetchable valid state. That is, the data in a buffer is fetchable only if the data in the buffer is valid. A client can remotely access another client's fetchable buffer using the API request-to-send call.

Some buffer attributes have semantics when combined and others do not. A buffer must be either persistent or nonpersistent. It cannot be both. Moreover, a buffer must have a send-only type, a receive-only type or a send-receive combination type. A buffer without one of these six attribute combinations is meaningless. The fetchable attribute implies the buffer is also persistent. The same is true for the adapter-only attribute. A buffer, for instance, cannot be fetchable (or adapter-only) and nonpersistent. Antegrams are formally storageless message packets. They require no buffer resources but are processed within this class-attribute paradigm in any event.

While the invention has been particularly shown and described with reference to preferred embodiments thereof, it will be understood by those skilled in the art that various changes in form and details may be made therein without departing from the spirit and scope of the invention.

For instance, a network of crossbar connected or cascaded crossbar switches providing a means of effective point-to-point communication among computer, or data server, or data manager resources executing their communications through intelligent adapters capable of executing semantics of the type described would also be considered a distributed memory computing system of the type disclosed herein. Such systems in addition to performing numerically intensive engineering and scientific applications as suggested earlier, could also perform various commercial applications such as query processing, transaction processing or various workstation server functions. Further, while an "ESCD" crossbar switch was suggested as one possible interconnection fabric, other switches would also be suitable for implementation of this invention. Also, such systems could be packaged physically close to each other, such as in the same rack or enclosure, or be distributed over whatever distance supported by the selected fabric and still benefit from this invention.

We claim:

1. A distributed memory digital computing system for performing a task, comprising:
   a) a plurality of processing units where each such processing unit includes:
      i) local processing means for performing a portion of the task;
      ii) local memory means coupled to said local processing means for storage and retrieval of data and commands involved in said portion of the task performed by said local processing means, which local memory means is accessible at least in part by other of said processing units;

iii) external communication path means for permitting unrestricted continuous access to said each such processing unit by said other of said processing units; and iv) adaptive interface means connecting said each such processing unit to said external communication path means for managing requests of data transfers from said local memory means at said each such processing unit, said requests being initiated by both said local processing means at said each such processing unit and by other local processing means at said other processing units, said adaptive interface means including:

FIFO queue means for queuing said requests without storing data requested for transfer with said request; and intelligence means for accessing said local memory means directly without intervention of said local processing means at said same processing unit upon receipt of a request from said other of said processing units;

b) point switch means connected to the external communication path means for all processing units in the plurality of processing units for passage of instructions for performance of the portions of the task and passage of portions of results between said processing units;

c) a controlling host computer system including separate processing means, not part of the plurality of processing units and said crosspoint switch means, for providing instructions and data to the plurality of processing units for performing the task by the plurality of processing units, said controlling host computer system including:

i) a host storage means coupled to said separate processing means for storage instruction and data for the performance of the task by the plurality of processing units;

ii) user interface means coupled to said separate processing means for inputting instructions and receiving output from the controlling host computer system; and d) host communication path means which is not part of said plurality of processing units and said crosspoint switch means, coupling said host computer means and at least one of said processing units in the plurality of processing units together for communication therebetween which said at least one of said processing units functions as a supervisory means for said plurality of processing units for receiving said task from the controlling host computer system, dividing said task into said portions, distributing said portions among others of the plurality of processing units and providing the results of said task to the controlling host computer system.

2. The distributed memory digital computing system of claim 1 wherein said adaptive interface means includes means for converting between optical data signals on said external communication path means and electrical data signals on channels in the processing units.

3. The distributed memory computer system of claim 1 wherein said controlling host computer system includes a channel connection means coupling said controlling host computer system to said host communication path means.

4. The distributed memory digital computing system of claim 1 wherein therein are two of said plurality of processing units forming said supervisory means, one of said two of said plurality of processing units for transmitting from said controlling host computer system and the other of said two of said plurality of processing units for transmitting to said controlling host computer system.

5. The distributed memory digital computing system of claim 4 wherein said local memory means in each said processing unit includes disk storage.

6. A distributed memory digital computing system for performing a task, comprising:

a. a plurality of processing units where each such processing unit includes:

i) a processor means for performing a portion of the task; and ii) memory means coupled to said processor means, said memory means having a local memory portion for storage and retrieval by said processor means in the same processing unit of information involved in performance of the portion of the task performed at said same processing unit and also having a global memory portion for the storage of information for transfer to other of said plurality of processing units;

b. external communication path means including crosspoint switch means for transfer of information between the processing units in performance of the task; and c. a plurality of adaptive interface means, a different one of said adaptive interface means associated with each one of the plurality of processing units to couple the processing unit with which said adaptive interface means is associated to the external communication means for managing requests of data transfers from said memory means of said processing unit with which said adaptive interface means is associated to other processing units in the plurality of processing units, said requests being initiated by both said processor means in said processing unit with which said adaptive interface means is associated and other of said processor means in the plurality of processing units, each said adaptive interface means including:

i) storage means for storage of said requests without storing the information to be transferred by said requests; and ii) intelligence means responsive to said requests stored in said storage means for directly accessing requested information in said global memory portion in said processing unit with which said adaptive interface means is associated, without intervention of said processor means at said processing unit with which said adaptive interface means is associated in response to said requests from other processing units of the plurality of processing units.

7. The distributed memory digital computing system of claim 6 wherein said intelligence means includes microprocessor means and intelligent memory accessing means.

8. The distributed memory digital computing system of claim 7 wherein said storage means is a FIFO queue means in which requests for transfer of information from said memory means are acted upon by said microprocessor means in the order in which the requests are entered into said FIFO queue means by said processor means.

9. The distributed memory computer system of claim 8 wherein said adaptive interface means includes means for converting between optical data signals on said external communication path means and electrical data signals in said processing units.

10. The distributed memory digital computer system of claim 9 wherein said memory means in each of said processing units includes disk storage.

* * * * *